INVENTOR
Ernest Wildhaber
BY
ATTORNEY

Dec. 23, 1941.    E. WILDHABER    2,267,182
CUTTER FOR CUTTING GEARS, SPLINED SHAFTS, AND THE LIKE
Filed Dec. 31, 1937    3 Sheets-Sheet 2

Ernest Wildhaber
INVENTOR

BY *signature*
ATTORNEY

Dec. 23, 1941. E. WILDHABER 2,267,182
CUTTER FOR CUTTING GEARS, SPLINED SHAFTS, AND THE LIKE
Filed Dec. 31, 1937 3 Sheets-Sheet 3
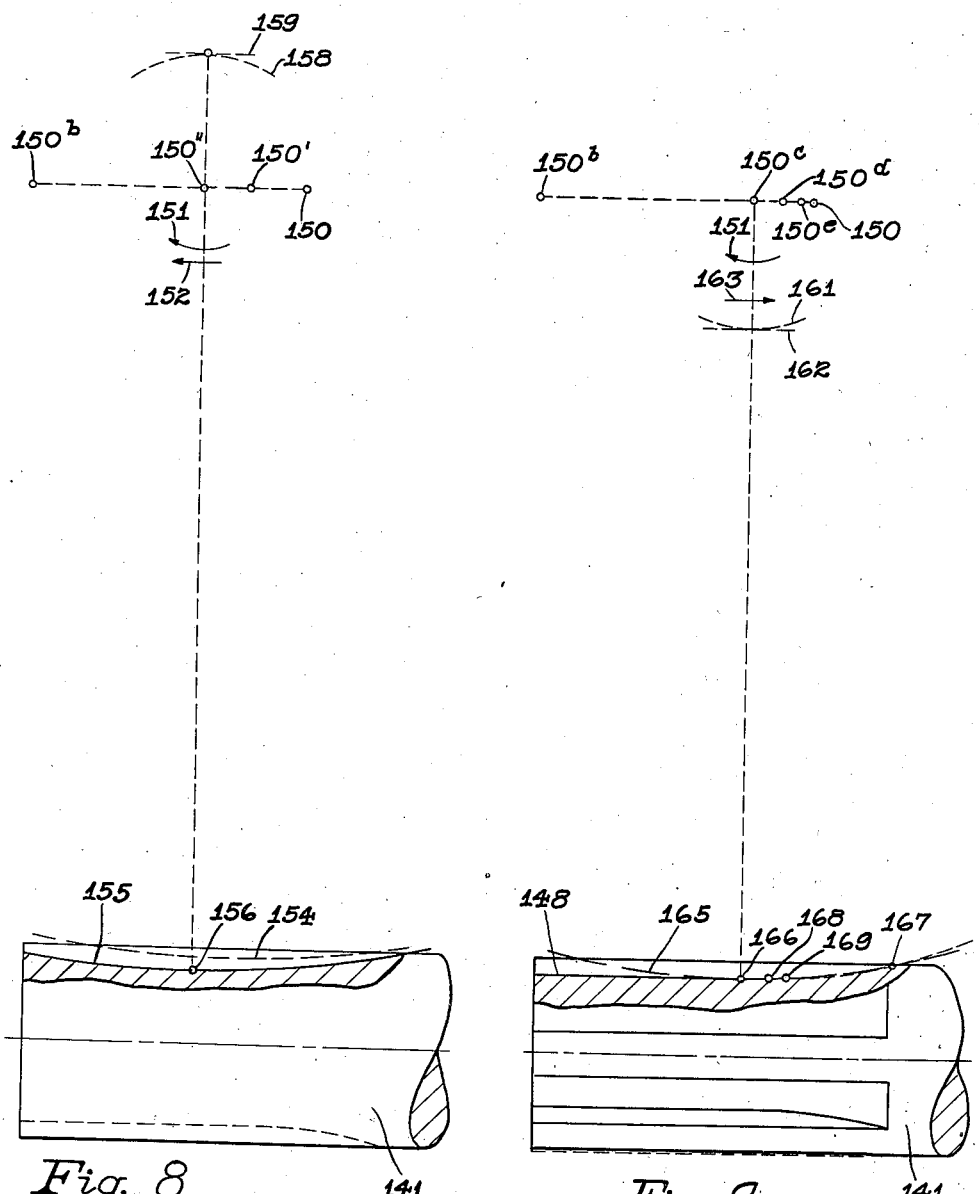
Fig. 8
Fig. 9
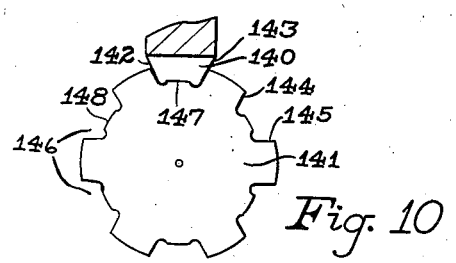
Fig. 10
Ernest Wildhaber
INVENTOR
BY *[signature]*
ATTORNEY Patented Dec. 23, 1941

2,267,182

UNITED STATES PATENT OFFICE 2,267,182

CUTTER FOR CUTTING GEARS, SPLINED SHAFTS, AND THE LIKE

Ernest Wildhaber, Irondequoit, N. Y., assignor to Gleason Works, Rochester, N. Y., a corporation of New York Application December 31, 1937, Serial No. 182,838

22 Claims. (Cl. 29—103)

The present invention relates to the manufacture of cylindrical gears, splined shafts and the like.

One purpose of the invention is to provide a method for cutting spur and helical gears, splined shafts and the like which will be extremely fast and which can be performed on machines of relatively simple construction.

A further purpose of the invention is to provide a cutting tool for carrying out the method which will be simple and inexpensive to make.

Still another object of the invention is to apply the basic principles of the inventions of my application, Serial Number 164,340, filed September 17, 1937, and of my application, Serial Number 181,177, filed December 22, 1937, to the manufacture of cylindrical gears and splined shafts. To this end, it is a purpose of the invention to provide a tool of rotary disc form for cutting cylindrical gears and splined shafts and to provide a method employing the same whereby a tooth space of a cylindrical gear or a groove of a splined shaft may be finished in a single revolution of the cutter. To this end, also, it is a further object of the invention to provide a tool for cutting cylindrical gears, splined shafts and the like which will be capable of both rough and finish-cutting a tooth slot of a gear or a groove of a splined shaft in a single revolution.

Another object of the invention is to provide a method and tool for cutting spur and helical gears with a localized tooth bearing, that is, spur and helical gears whose tooth surfaces will have less than full length contact with the tooth surfaces of a mate gear when the pair are in mesh.

A still further object of the invention is to provide improved forms of spur and helical gearing.

Other objects of the invention will be apparent hereinafter from the specification and from the recital of the appended claims.

In the preferred embodiment of the invention, a rotary cutter of disc form is employed that has a plurality of radially disposed cutting blades arranged part-way around its periphery with a gap between the last and first blades which is of sufficient angular extent to permit of indexing the work, when the gap is abreast of the work, without relative separation of cutter and work. In the preferred embodiment of the invention, also, the cutter is provided with both roughing and finishing blades. The roughing blades are made of progressively increasing height while the finishing blades are of uniform height. The height of the roughing blades increases up to the full depth of the tooth space or groove to be cut as a limit.

In use, the cutter is adjusted into engagement with the gear blank or splined shaft to be cut so that the blades of the cutter will cut to the full depth of the tooth spaces or grooves, which are to be produced, without relative depthwise feed between the cutter and the work. The cutting operation itself may be performed in different ways. For cutting a spur gear of narrow face-width, the cutter is preferably rotated on a relatively fixed axis while the roughing blades are in operation; then, as successive finishing blades come into action, it is fed, as it rotates, across the face of the blank so that the tooth space or groove produced may have a uniform tooth depth from end to end and a straight tooth bottom. When the gap in the cutter comes abreast of the blank, the cutter is returned to its initial position and the blank is indexed. For spur gears of long face width, the cutter may be traversed across the face of the gear blank both during the roughing and finishing operations. By feeding the cutter during roughing, the amount of stock to be removed by the finishing blades is reduced.

In the cutting of helical gears, the lengthwise feed motion is preferably imparted to the work and the cutter is simply rotated on its axis in time with this feed movement. In the case of such gears, the feed movement is a helical motion, that is, a motion about and in the direction of the blank axis. The blank is inclined to the plane of rotation of the cutter at an angle corresponding to the angle of lengthwise inclination of the helical teeth to be produced on the blank. The blank is indexed, as before, when the gap in the cutter is abreast of the blank.

The cutters employed for cutting either spur or helical gears are preferably provided with finish-cutting edges which are of concave circular arcuate profile. The tooth surfaces produced upon spur gears, then, are of circular arcuate profile shape. Such gears are preferable to the known involute type of spur gears since the tooth profiles will have a slight relief at the tops and bottoms which makes for quieter operation.

Helical teeth produced with cutters made according to the present invention more nearly approach involute teeth in profile shape and may be made to very closely approximate involutes if desired.

It is also possible with the present invention to produce a desirable localization in lengthwise tooth bearing on the gears cut, by making the cutter so that the side cutting edges which finish-cut at the two ends of the gear teeth are offset laterally with reference to corresponding side-cutting edges which cut at the middle of the face. Thus, the gear tooth will have a crowned formation from end to end and will mesh with the teeth of the mate gear with less than full length tooth bearing. With the present invention then, spur and helical gears may be cut which will be capable of adjustment in use and which will run quiet despite variations in mountings or in loads.

In the cutting of splined shafts, the cutter and method employed are similar to that used in the cutting of spur or helical gears. The cutter has cutting blades arranged part-way only around its periphery and again the cutter is provided preferably with both roughing and finishing blades. It is fed relative to the work in one direction during roughing and in the opposite direction during finishing. The side-cutting edges of the cutter are inclined to the plane of rotation of the cutter at the angle of the opposite side surfaces of the grooves of the splined shaft to be cut and the side-cutting edges are complementary in shape to the sides of the splines to be cut thereby. The work is held stationary during actual cutting but is indexed when the gap in the cutter is abreast of the work.

Preferably each of the blades of a cutter employed in practicing the present invention is sharpened so that it has two cutting edges at opposite sides. The roughing blades are preferably made of gradually increasing height to the depth of the tooth space as a limit and the roughing blades are made thinner than the finishing blades so that stock will be left on the sides of the tooth space or groove after the roughing blades have completed their operation which may be removed by the finishing blades.

With any of the illustrated embodiments of the invention, a tooth space of a gear or a groove of a splined shaft is completed on each revolution of the cutter and the work is finished when the cutter has made as many revolutions as there are tooth spaces or grooves to be cut.

A machine built to carry out the present invention will be of very simple construction because the gears are cut without generating roll and the only motions required are rotation of the cutter, lengthwise feed of the cutter relative to the work, and indexing of the work.

Several different embodiments of the invention are illustrated in the accompanying drawings in which:

Figs. 8 and 9 are diagrammatic views illustrating the successive steps of rough and finish-cutting a groove in a splined shaft by the process of the present invention; and Fig. 10 is an end view of a splined shaft and showing the shape of the blades of a cutter for cutting the same.

Figure 1:
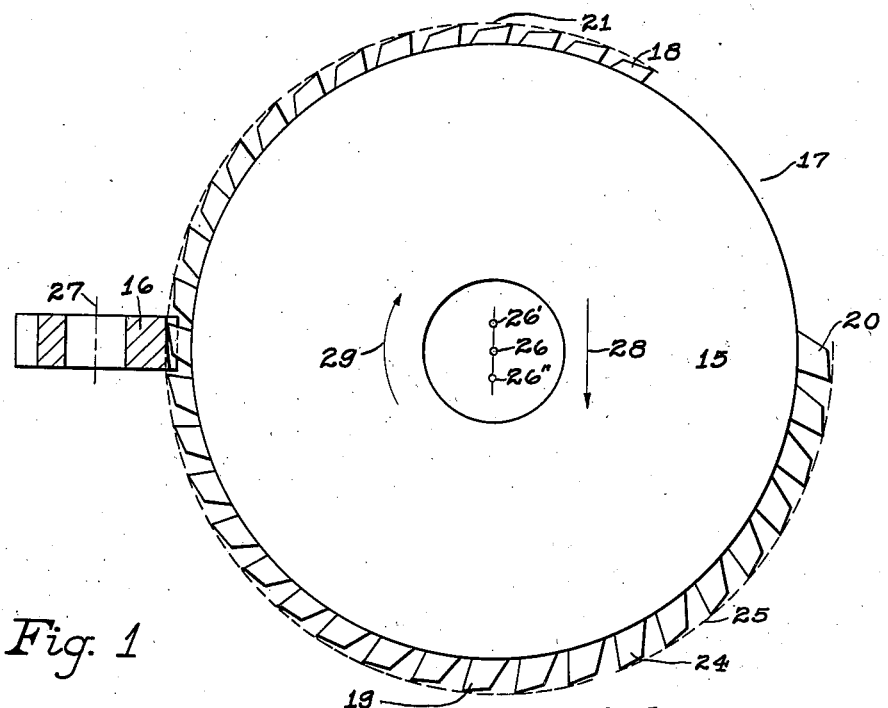
Fig. 1 is a view showing one method of cutting a spur gear according to this invention.

In Fig. 1, 15 denotes the cutting tool and 16 is the spur gear to be cut. The cutting tool has a plurality of cutting blades arranged part-way around its periphery and there is a gap denoted at 17 between the last blade 20 and the first blade 18. The blades beginning with blade 18 and including the blade numbered 19 are of progressively increasing height and have their top cutting edges arranged in a spiral 21. These blades are roughing blades and cut to the full depth of the tooth spaces of the gear blank as a limit. The blade 19 may be followed by one or more roughing blades of full height to insure complete stocking-out of the blank and then follow the finishing blades, starting with say blade 24 and including blade 20. These blades are of uniform height and have their top cutting edges arranged in a circle 25 concentric to cutter axis 26.

During depth-roughing of a spur gear of relatively narrow face-width, such as that shown in the drawings, that is, during operation of the spirally arranged roughing blades from blade 18 to blade 19 inclusive, the cutter axis 26 is preferably maintained in a fixed position relative to the gear blank 16 and the cutter simply rotates in engagement with the blank. During action of the blades 18 to 19 inclusive, then, a tooth space will be cut having a curved bottom which is of the desired depth at its center. The rotating cutter is then fed rapidly across the face of the gear blank from axis-position 26 to axis-position 26' and then, while the cutter continues to rotate in the same direction, it is fed back across the blank in direction 28 until its axis reaches the position 26''. During the latter feed movement, the tooth space is finished. The gear blank is held stationary on its axis 27 during operation of all the cutting blades, but is indexed when the gap 17 in the cutter is abrest of the blank. Since the rotation of the cutter is in the direction 29, then, when the feed is in direction 28, the finishing cut is a climb cut and will produce a smooth tooth surface.

It is to be understood that the feed movement may be imparted either to the cutter, as described, or to the work. It is further to be understood that for gears of wide face length, a feed movement across the face of the blank may be employed during roughing as well as during finishing. Where the feed movement is employed during roughing, less stock will be left on the gear blank to be removed by the finishing blades.

Figure 2:
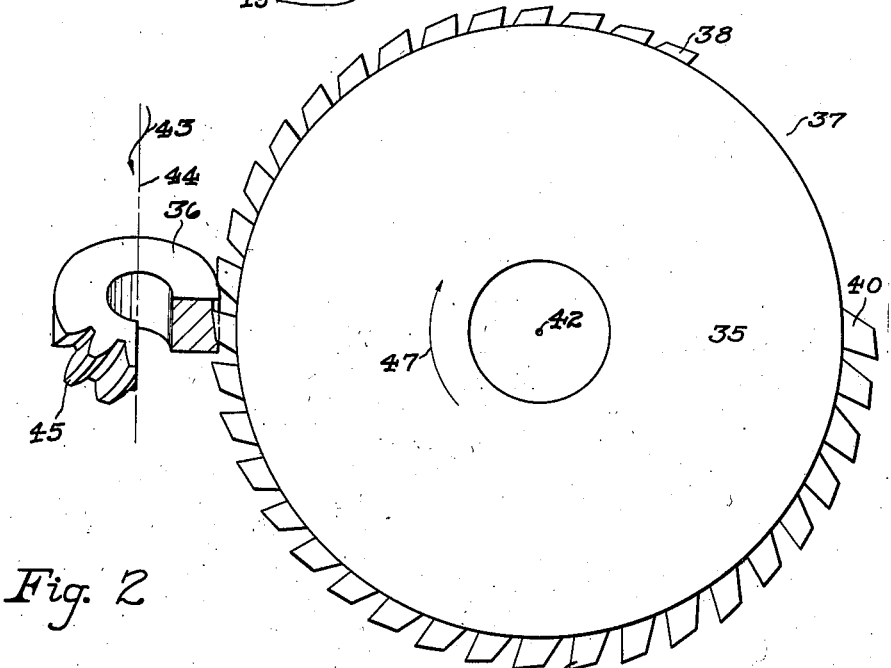
Fig. 2 is a view illustrating one method of cutting a helical gear.

Fig. 2 illustrates an application of the invention to the cutting of helical gears such as the gear shown at 36. The cutter 35 may be identical with cutter 15. In any event, like cutter 15, it has preferably a plurality of roughing blades and a plurality of finishing blades. The roughing blades begin with blade 38 and include blade 39 and are of progressively increasing height and are intended to cut to the full depth of the tooth spaces of the gear blank as a limit. These may be followed by one or more roughing blades, which are of full height, and then by the finishing blades, which are of uniform height. There is a gap 37 between the last finishing blade 40 and the first roughing blade 38 to permit of indexing the blank when this gap is abreast of the blank in the rotation of the cutter.

As before, for gears of narrow face width, the cutter axis 42 may be relatively fixed during roughing and the relative feed movement between the cutter and blank may only be effected during the finishing operation. For gears of considerable face width, however, feed may be employed both during roughing and finishing. The feed may be imparted either to the cutter or to the work. In Fig. 2, the feed is shown as imparted to the work and is a helical movement, as indicated by the arrow 43, consisting of a motion about and in the direction of the gear axis 44.

The gear is adjusted prior to the cut so that its axis 44 is inclined to the plane of rotation of the cutter, which is the plane of the drawings, at an angle corresponding to the inclination of the teeth 45 of the gear to the axis 44 of the gear, and the lead of the helical motion 43 is determined by this inclination of the teeth 45 of the gear to be produced. As before, the direction of feed 43 during operation of the finishing blades is preferably in the same direction as the direction 47 of rotation of the cutter so that the cutter effects a climb cut during finishing.

The blank 36 is held stationary on its axis except for its helical feed movement, that is, it has no generating roll and the tooth profiles produced on the blank are dependent solely upon the shape of the finishing blades and the diameter of the cutter 35 used in cutting the blank. When the gap 37 in the cutter is abreast of the blank, the blank is indexed to bring another tooth space into position to be cut, and, during the indexing movement, the feed is reversed to return the blank to starting position.

In both described embodiments of the invention, then, a tooth space of a gear blank will be roughed and finished on each revolution of the cutter and the gear will be completed when the cutter has made as many revolutions as there are tooth spaces in the gear to be cut.

As has already been indicated, the profile shapes of the tooth surfaces of a spur gear cut by the method of the present invention are complementary to the profile shapes of the finish-cutting edges of the cutter which is used to produce the gear. The cutting blades of the cutter may therefore be made with finish-cutting edges of involute or of any other suitable profile shape. I prefer, however, to make the cutter with finish-cutting edges of circular arcuate shape because such a cutter is easy to manufacture to a high degree of accuracy and because, moreover, I have found that cylindrical gears which have tooth profiles of circular arcuate curvature have a desirable relief at the tops and bottoms of the teeth when run in mesh and are, therefore, free from the objectionable noise which seems to arise where gears have full profile contact. In the embodiments of my invention illustrated in the drawings, then, I have shown cutters provided with finish cutting edges of concave circular arcuate profile shape which are adapted to produce convex tooth surfaces on the gear blank which are of complementary circular arcuate profile. Such gears are new at ratios of other than 1 to 1.

On helical teeth produced with large cutters of circular arcuate profile the tooth profiles produced are more curved than said circular cutter profile and have a moderately changing curvature.

Figure 3:
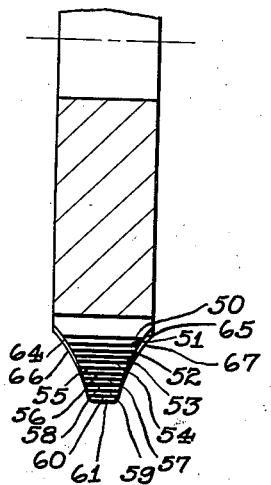
Fig. 3 is a diagrammatic view illustrating how the roughing blades of a cutter may be made in one embodiment of this invention and showing the relation of the roughing blades to the finishing blades.

One way in which a cutter may be constructed according to the present invention is illustrated diagrammatically in Fig. 3. This cutter has its roughing blades arranged as on a circular broach, that is, the blades are of progressively increasing height and have their side cutting edges arranged to produce a roughed tooth shape closely approximating the finished shape which it is desired to produce on the gear. The roughing blades are shown superimposed upon one another and the tops of these blades are designated at 50 to 61 inclusive. In the preferred embodiment, all of these blades are double edged blades, that is, they cut at opposite sides of the tooth slots and together they compose the roughed tooth space profile comprised between the lines 64 and 65. The roughing blades are made narrower than the finished width of the tooth slots to be cut so that stock will be left on the sides of the tooth slots, after the roughing blades have completed their operation, to be removed by the finishing blades. Thus, as shown in Fig. 3, the finish-cutting edges 66 and 67 of the cutter are offset laterally with reference to the lines 64 and 65, respectively, which denote the roughing profile of the cutter. The lines 66 and 64 and 65 and 67, respectively, are here shown as converging toward their tips. This construction permits of fairly wide point-widths on both roughing and finishing blades and permits of carrying off the heat generated by the friction of cutting quite rapidly and makes for a long-lived tool. The finish cutting edges 66 and 67 in the embodiment shown are of circular arcuate shape. The side-cutting edges of the roughing blades may also be made, and preferably are made, of circular arcuate curvature.

Figure 4:
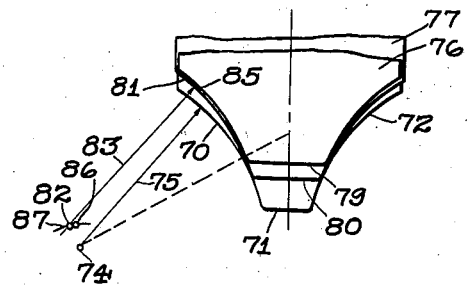
Fig. 4 is a view on an enlarged scale illustrating a modification of the invention and showing another arrangement of roughing blades.

A modified arrangement of roughing blades is shown in Fig. 4. The shape of the roughed tooth slots to be cut by the roughing blades is denoted by the lines 70, 71, 72. The sides 70 and 72 are circular arcs, the center of the side 70 being denoted at 74 and its radius at 75. The roughing blades, of which two are shown, designated at 76 and 77, respectively, are shaped so that their side-cutting edges do not contact the roughed profiles 70 and 72 which are to be produced, except with their tip cutting edges 79 and 80. Thus rubbing of the sides of the blades on the sides of the tooth slot being cut is avoided. In the instance shown, this result is attained by making the side profiles of the roughing blades circular arcs whose centers are offset from the centers of the tooth space profiles to be cut and arranged on circles about the centers of that profile. Thus, the side cutting edge 81 of the blade 77 is a circular arc whose center is at 82 and whose radius 83 is equal to the radius 75. The preceding blade 76 has a side profile 85 which is a circular arc of the same radius 75 and has its center at 86. The two centers 82 and 86 lie on the circle 87 circumscribed about the profile center 74. The profiles 70 and 72 cut by the successive roughing blades lie, of course, within the profiles cut by the finish-cutting edges of the cutter.

In a still further modification of the invention, the cutter may be provided with roughing blades having circular arcuate side profiles whose centers are spaced uniformly along a straight line which may either be parallel to the cutter axis or at right angles to it. The arrangement is such that each roughing blade contains only a portion of the tooth profile 70 or 72 which is to be cut.

It is further to be understood that in many cases, there might be no objection to the roughing blades having a slight rubbing action during cutting. In such cases, the cutting profiles of the roughing blades may be made identical, except for depth, with the profiles 70 and 72 to be cut by the roughing blades.

As has already been mentioned, it is possible with the present invention to cut spur and helical gears having a localized lengthwise tooth bearing. For this purpose, a cutter will be employed which has certain of its finish-cutting edges offset laterally with reference to other finish-cutting edges. Thus, the finish cutting edges which cut at opposite ends of a tooth slot will be spaced further apart than the finish cutting edges which cut at the center of the tooth slot. With such a cutter, a tooth slot will be produced which is wider at its ends than at its center and the teeth of the gear will accordingly be wider at their centers than at their ends. When a gear so cut is meshed with a mate gear cut in the same fashion or with a mate gear whose teeth are of uniform thickness from end to end, the mating tooth surfaces of the pair of gears will only have localized contact or bearing.

Figure 5:
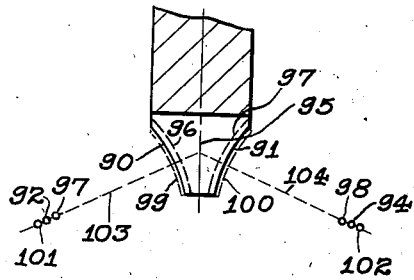
Fig. 5 is a view illustrating diagrammatically one arrangement of blades on a cutter where it is desired to produce a localized tooth bearing on the gear being cut.

A cutter for cutting gears with a localized tooth bearing is illustrated diagrammatically in Fig. 5. 90 and 91 denote, respectively, the opposite side cutting edges of the finishing blade which cuts midway the length of the gear tooth. These cutting edges are circular arcs whose centers are at 92 and 94, respectively. For cylindrical gears, opposite side cutting edges of the cutter will ordinarily have equal radii of curvature and be equally inclined to a plane of rotation of the cutter such as the plane 95. The roughing profiles of the cutter are denoted at 96 and 97, respectively, and are spaced laterally from the finishing profiles 90 and 91, respectively, so as to effect a thinner cut and leave a slight amount of stock for finishing. The roughing profiles are centered at 97 and 98, respectively. 99 and 100 denote, respectively, the opposite side-cutting edges of the finishing blades which finish at the two ends of the tooth space. The centers 101 and 102 of these cutting edges are located, like the centers 92 and 94, on the normals 103 and 104, respectively. As will be seen, the cutting edges 99 and 100 for finishing at the ends of the tooth slots are offset laterally from the cutting edges 90 and 91 which finish-cut at the center of the tooth slots, and so more stock is removed from the ends of the tooth slots during the finishing cut, and therefore the desired localized tooth bearing will be provided.

Figure 6:
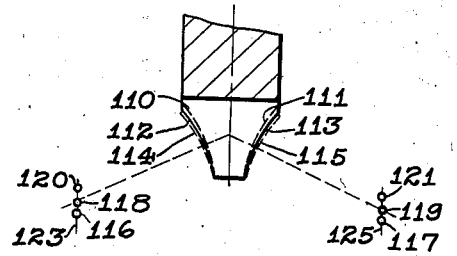
Fig. 6 illustrates a modified arrangement of blades of a cutter suited to produce a localized tooth bearing.

A modified form of cutter for producing a localized tooth bearing is illustrated in Fig. 6. Here the roughing profiles are denoted at 110 and 111, respectively. The finishing profiles, which cut at the center of the tooth length, are designated at 112 and 113, respectively and the finishing profiles, which cut at the ends of the tooth, are designated at 114 and 115, respectively. In this modification of the invention, the roughing and end-finishing profiles are displaced radially in opposite directions with reference to the central finishing profiles 112 and 113. The respective centers of the profiles 114, 112 and 110 are denoted at 116, 118 and 120, respectively, and lie on line 123 which is radial of the cutter axis. The opposite side profiles 111, 113 and 115 are centered at 121, 119 and 117, respectively, and these centers lie on the line 125 also radial of the cutter axis. In this embodiment of the invention, the end-finishing profiles 114 and 115 converge at their tips toward the middle finishing profiles 112 and 113. The end finishing profiles, therefore, provide more localization of bearing at the tops of the gear teeth than at the bottoms. This is entirely satisfactory, however, because the flank portion of the profile of one gear will mesh with the top portion of the profile of the mate gear, and vice versa, and, therefore, despite the difference in localization of bearing between the top and flanks of their teeth, the two gears will mesh properly together.

Figure 7:
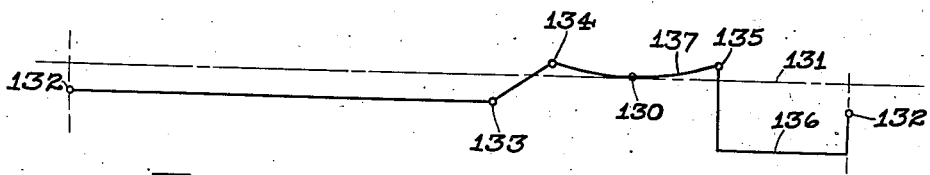
Fig. 7 is a diagrammatic view illustrating the relationship of finishing and roughing blades in a cutter constructed to produce a localized tooth bearing.

Fig. 7 is a diagrammatic view showing the development of the cutting edges of a cutter made to produce a localized tooth bearing according to the principles of this invention. The position of the finish-cutting edges which cut midway the length of the tooth is denoted at 130 on the line 131. The distance other cutting edges lie at one side or the other of this line 131, indicates their relation to the mean cutting edge 130. The cutting edges of the roughing blades lie along the line 132—133 and are offset laterally inwardly away from the finish-cutting edge 130. The finish-cutting edges 134 and 135, however, which finish-cut at the opposite ends of the tooth space are offset laterally outwardly away from the finish-cutting edge 130. Thus they are capable of producing the desired localization of tooth bearing. Other finish-cutting edges of the cutter lie on the curved line 137, that is, the finish-cutting edges are progressively offset laterally from one another from the cutting edge 130, which cuts midway the length of the tooth spaces of the gear, toward the cutting edges 134 and 135 which cut at the ends of the tooth spaces. 136 denotes the indexing gap in the cutter.

Figs. 8 to 10 inclusive show how the present invention may be applied to the cutting of splined shafts. Here again a rotary disc cutter is used that has a plurality of cutting blades arranged part-way around its periphery with a gap between the last and first blades for indexing. In the preferred embodiment, the cutter has again both roughing and finishing blades. The roughing blades may be of progressively increasing height and the finishing blades of uniform height in a manner similar to the cutters previously described. The finish-cutting blades of the cutter will have finishing edges complementary to the sides of the splines which are to be cut. The top cutting edges of the blades may also be made complementary in shape to the shape which it is desired to produce on the bottoms of the grooves between the splines. Thus, as shown in Fig. 10, the finishing blades 140 of the cutter, which is to cut the splined shaft 141, have opposite side-cutting edges 142 and 143 which are inclined to the plane of rotation of the cutter at an angle corresponding to the angle between the opposite side surfaces 144 and 145 of the grooves to be produced in the shaft and these opposite side-cutting edges 142 and 143 are of straight profile corresponding to the profile shapes of the side surfaces which they are to cut. Further, the top cutting edges 147 of the blades are shaped complementary to the bottom land 148 of the grooves 146. Thus, with my cutter, a complete groove may be cut in a splined shaft in one revolution of the cutter.

The manner in which the cutter is used to cut a splined shaft is similar to that previously described for the cutters employed in the cutting of spur and helical gears. In the embodiment shown, the cutter is positioned initially so that its center is at 150 and is rotated in the direction of the arrow 151 while being fed in the direction of the arrow 152. By the time the feed movement has progressed far enough for the cutter center to reach the position 150', the roughing blades of the cutter will have taken a roughing cut denoted by the line 154 which extends about half-way the full depth of the groove to be cut. When the feed has progressed far enough for the center of the cutter to reach position 150'', full depth will have been reached. The roughing cut is then along the line 155 whose radius is larger than the cutter radius 150''—156 because of the direction of feed of the cutter. Hence, the roughing cuts taken are long, sweeping cuts.

If the cutter is fed relative to the work at a constant rate, for at least a portion of the feed movement, it is as if a circle 158 circumscribed about the axis of the cutter were rolling on a straight line 159 which is connected to the work. The radius of curvature of the cut at any point can then readily be determined. Let $r$ denote the radius 150''—156 of the cutter and $c$ be the radius of the circle 158 which indicates the rate of feed. The radius of curvature $r'$ of the cut at the point 155 is then known to be $$r' = \frac{(r+c)^2}{r}$$

which accounts for the long sweeping roughing cuts.

It is also to be noted from the positions of the cutting paths 154, 155 that both the individual chips and the aggregate chips taper in thickness. They have a reduced thickness at the start of the cut where the shock-load occurs. This light chip thickness at the start helps to prolong the cutter life.

After the cutter has cut to full depth, it may be moved on to its end position where its axis is at 150b, at an increased rate of feed. At this end position, the cutter will have rotated far enough on its axis for the last roughing blade to have taken its cut. Then the direction of feed is reversed and the finishing operation begins with the cutter continuing to rotate in the same direction as before, but with the finishing blades coming successively into action as the cutter moves back to the right.

The feed movement for the finishing cut may be at a constant rate and as if a circle 161 circumscribed about the axis of the cutter were rolling on a straight line 162 (Fig. 9) connected with the work. Inasmuch as the cutter is still rotating in the direction of the arrow 151 whereas the feed is now in the direction of the arrow 163, the finishing is done with what is known as a climb cut. Each cutting edge of the cutter in taking its cut, then, moves in a path relative to the work whose radius is smaller than the radius of the cutter. The curvature radius of the cutting path at any point of the bottom of the spline may be computed with the formula given above by introducing the radius $c$ of the circle 161 as a negative quantity. The finishing cuts are therefore as if made by a smaller cutter than that actually used and the finish-cutting edges, therefore, quickly clear the work. When the cutter center has reached the point 150c, the periphery of the cutter will occupy the position denoted at 165, tangent to the bottom 148 of the groove being cut at the point 166. A cutting edge embodying the point 167 will reach the bottom of the groove at point 168 when the cutter center is at 150d. At this point in the operation, a groove of full depth for a satisfactory length will have been obtained. The cutting operation does not, then, need to proceed any further. In other words, the cutting blade which embodies the point 167 may be the final blade of the cutter. The cutter may then be returned to its starting position 150 and during this further movement, the work may be indexed since the gap in the cutter is now abreast of the work. The slot cut in the desired operation, then, is full depth up to the point 168 and runs out from the point 168 to the point 167. When a shorter run-out is desired, the feed movement may be accelerated at the end of the finishing cut. In this manner, it is possible to obtain a still smaller curvature radius. Thus full depth may be obtained up to a point 169 which corresponds to position 150e of the cutter center.

While several different embodiments of the invention have been described, it will be understood that the invention is capable of still further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A rotary disc cutter for cutting cylindrical gears, splined shafts or the like, which has a plurality of radially disposed roughing blades followed by a plurality of radially disposed finishing blades both the roughing and finishing blades having opposite side-cutting edges which are symmetrically disposed with reference to a plane of rotation perpendicular to the axis of the cutter, corresponding side cutting edges of said blades being of the same profile shape and having uniform positive inclination to said plane of rotation, and the finishing blades being of uniform height.

2. A rotary disc cutter for cutting cylindrical gears, splined shafts or the like, which has a plurality of radially disposed roughing blades followed by a plurality of radially disposed finishing blades arranged part-way only around its periphery with a gap between the last and first blades which is of sufficient angular extent to permit of indexing the work, when the gap in the cutter is abreast of the work, without relative separation of the cutter from the work, the roughing blades being of progressively increasing height up to the full height of the tooth space or groove which is to be cut, as a limit, and the finishing blades being of uniform height, corresponding side cutting edges of the finishing blades being of the same profile shape and having uniform positive inclination to a plane of rotation perpendicular to the axis of the cutter.

3. A rotary disc cutter for cutting cylindrical gears, splined shafts or the like, which has a plurality of radially disposed roughing blades followed by a plurality of radially disposed finishing blades arranged part-way only around its periphery with a gap between the last finishing blade and the first roughing blade, said gap being of sufficient angular extent to permit of indexing the work, when the gap is abreast of the work, without relative separation of the cutter from the work, corresponding side-cutting edges of the finishing blades having the same profile shape and having the same positive inclination to a plane of rotation perpendicular to the axis of the cutter, and the side-cutting edges of the finishing blades being offset axially of the cutter with reference to corresponding side-cutting edges of the roughing blades.

4. A rotary disc cutter for cutting cylindrical gears, splined shafts or the like which has a plurality of radially disposed roughing blades followed by a plurality of radially disposed finishing blades arranged part-way only around its periphery with a gap between the last and first blades, said gap being of sufficient angular extent to permit of indexing the work, when the gap is abreast of the work, without relative separation of the cutter from the work, the finishing blades being of the same height and having corresponding side-cutting edges which are uniformly inclined to a plane of rotation perpendicular to the axis of the cutter and which are complementary to the profile shape of the sides of the tooth space or groove to be cut.

5. A rotary disc cutter for cutting cylindrical gears, splined shafts or the like which has a plurality of radially disposed roughing blades followed by a plurality of radially disposed finishing blades arranged part-way only around its periphery with a gap between the last finishing blade and the first roughing blade, said gap being of sufficient angular extent to permit of indexing the work without relative withdrawal of the cutter from the work, corresponding side-cutting edges of the finishing blades being of the same concave profile shape and being uniformly inclined to a plane of rotation perpendicular to the axis of the cutter.

6. A rotary disc cutter for cutting cylindrical gears, splined shafts or the like which has a plurality of radially disposed roughing blades of progressively increasing heights followed by a plurality of radially disposed finishing blades of uniform height, both the roughing and the finishing blades having side-cutting edges which are of circular arcuate profile shape, but the centers of curvature of the side cutting edges of the roughing blades being offset from the centers of curvature of the corresponding side cutting edges of the finishing blades, the finishing blades being of uniform height and corresponding side-cutting edges of the finishing blades having the same inclination to a plane of rotation perpendicular to the axis of the cutter.

7. A rotary disc cutter for cutting cylindrical gears which has a plurality of radially disposed finishing blades arranged part-way around its periphery only with a gap between the last and first blades which is of sufficient angular extent to permit of indexing the work, when the gap is abreast of the work, without relative withdrawal of the cutter from the work, said blades being of the same height and having corresponding side-cutting edges of the same profile shape, the intermediate blades of the cutter having their side-cutting edges offset axially of the cutter with reference to the corresponding side-cutting edges of other blades of the cutter.

8. A rotary disc cutter for cutting cylindrical gears which has a plurality of radially disposed finishing blades arranged part-way around its periphery only with a gap between the last and first blades which is of sufficient angular extent to permit of indexing the work, when the gap is abreast of the work, without relative withdrawal of the cutter from the work, opposite side cutting edges of the blades being symmetrically disposed with reference to a plane of rotation perpendicular to the axis of the cutter, said blades being of uniform height, and corresponding side cutting edges of the blades having uniform positive inclination to said plane of rotation.

9. A rotary disc cutter for cutting cylindrical gears by rotation of the cutter and simultaneous relative movement of the cutter longitudinally of the tooth space of the gear which is to be cut, said cutter having a plurality of roughing blades followed by a plurality of finishing blades arranged part-way only around its periphery with a gap between the last finishing blade and the first roughing blade which is of sufficient angular extent to permit of indexing the work, when the gap is abreast of the work, without relative withdrawal of the cutter from the work, the side-cutting edges of the finishing blades being offset laterally from the corresponding side-cutting edges of the roughing blades and the side-cutting edges of certain of the finishing blades being further offset laterally with reference to corresponding side-cutting edges of other finishing blades.

10. A rotary disc cutter for cutting cylindrical gears by rotation of the cutter and simultaneous relative movement of the cutter longitudinally of the tooth space of the gear which is to be cut, said cutter having a plurality of roughing blades followed peripherally by a plurality of finishing blades whose side-cutting edges are inclined to the plane of rotation of the cutter, the side-cutting edges of the finishing blades being offset laterally from corresponding side-cutting edges of the roughing blades, and the side-cutting edges of certain finishing blades being further offset laterally with reference to corresponding side-cutting edges of other finishing blades.

11. A rotary disc cutter for cutting cylindrical gears by rotation of the cutter and simultaneous relative movement of the cutter longitudinally of the tooth space which is to be cut, said cutter having a plurality of peripherally arranged radially disposed finishing blades whose opposite side-cutting edges are symmetrically disposed with reference to a plane of rotation perpendicular to the axis of the cutter, corresponding side cutting edges of the blades being of the same curved profile shape and having the same inclination to said plane of rotation, the side-cutting edges of certain of the finishing blades being laterally offset with reference to the corresponding side-cutting edges of other finish-cutting blades.

12. A rotary disc cutter for cutting cylindrical gears by rotation of the cutter and simultaneous relative movement of the cutter longitudinally of the tooth space which is to be cut, said cutter having a plurality of radially disposed peripherally arranged finishing blades whose opposite side-cutting edges are of concave profile shape and are symmetrically disposed with reference to a plane of rotation perpendicular to the axis of the cutter, corresponding side cutting edges of the blades having the same profile shape and having the same inclination to said plane of rotation, the side-cutting edges of certain of the finishing blades being laterally offset with reference to the corresponding side-cutting edges of other finishing blades.

13. A rotary disc cutter for cutting cylindrical gears by rotation of the cutter and simultaneous relative movement of the cutter longitudinally of a tooth space which is to be cut, said cutter having a plurality of radially disposed peripherally arranged finishing blades whose opposite side-cutting edges are of concave circular arcuate profile shape and are symmetrically disposed with reference to a plane of rotation perpendicular to the axis of the cutter, corresponding side-cutting edges of the blades having the same profile shape and having the same inclination to said plane of rotation, the side-cutting edges of certain finishing blades being laterally offset with reference to the corresponding side-cutting edges of other finishing blades.

14. A rotary disc cutter for cutting cylindrical gears by rotation of the cutter and simultaneous relative movement of the cutter longitudinally of the tooth space which is to be cut, said cutter having a plurality of radially disposed finishing blades arranged around its periphery, corresponding side-cutting edges of successive finishing blades being offset laterally relative to one another inwardly from the first blade to an intermediate blade and then outwardly from the intermediate blade to the last blade.

15. A rotary disc cutter for cutting cylindrical gears by rotation of the cutter and simultaneous relative movement of the cutter longitudinally of the tooth space which is to be cut, said cutter having a plurality of finishing blades arranged around its periphery, said blades having side-cutting edges of concave circular arcuate profile curvature, the radii of curvature of corresponding side-cutting edges of the blades being equal but corresponding side-cutting edges of different blades having centers of curvature displaced from one another progressively in one direction beginning with tthe first finishing blade to an intermediate finishing blade and progressively in the opposite direction from said intermediate blade to the last finishing blade.

16. A rotary disc gear cutter having a plurality of radially disposed roughing blades followed by a plurality of radially disposed finishing blades, both the roughing and finishing blades having side cutting edges of circular arcuate profile shape, but the centers of curvature of the side-cutting edges of the roughing blades being offset from the centers of curvature of the corresponding side cutting edges of the finishing blades, the roughing blades being of progressively increasing height, and the finishing blades being of uniform height, and corresponding side-cutting edges of the finishing blades having the same profile shape and the same inclination to a plane of rotation perpendicular to the axis of the cutter.

17. A rotary disc cutter having a plurality of radially disposed roughing blades followed by a plurality of radially disposed finishing blades, both the roughing and the finishing blades having side cutting edges of straight profile and positive inclination to the axis of the cutter, corresponding side-cutting edges of both the roughing and finishing blades having the same inclination to the axis of the cutter, the roughing blades being of progressively increasing height, and the finishing blades being of uniform height.

18. A rotary disc gear cutter for cutting cylindrical gears, splined shafts, and the like, having a plurality of radially disposed blades arranged part way only around its periphery with a gap between the last and the first blades which is of sufficient angular extent to permit of indexing the work, when the gap is abreast of the work, without relative withdrawal of the cutter from the work, opposite side-cutting edges of the blades being symmetrically disposed with reference to a plane of rotation perpendicular to the axis of the cutter, said blades being of uniform height, and corresponding side-cutting edges of the blades having the same profile shape and having uniform inclination to said plane of rotation.

19. A rotary disc cutter having a plurality of radially disposed blades arranged part way only around its periphery with a gap between the last and first blades which is of sufficient angular extent to permit of indexing the work, when the gap is abreast of the work, without relative withdrawal of the cutter from the work, opposite side cutting edges of said blades being symmetrically disposed with reference to a plane of rotation perpendicular to the axis of the cutter, corresponding side cutting edges of the blades having straight profile shape and uniform positive inclination to said plane of rotation.

20. A rotary cutter having a plurality of radially disposed blades arranged part way only around its periphery with a gap between the last and the first blades which is of sufficient angular extent to permit of indexing the work, when the gap is abreast of the work, without relative withdrawal of the cutter from the work, opposite side cutting edges of the blades being symmetrically disposed with reference to a plane of rotation perpendicular to the axis of the cutter, said blades being of uniform height, and corresponding side cutting edges of the blades having the same concave circular arcuate profile shape, and having the same inclination to said plane of rotation.

21. A rotary disc cutter having a plurality of radially disposed finish-cutting blades which are of uniform height and whose opposite side-cutting edges are symmetrically disposed with reference to a plane of rotation perpendicular to the axis of the cutter, corresponding side-cutting edges of the blades being of curved profile shape and having the same inclination to said plane of rotation, and certain of the blades having their side-cutting edges offset axially of the cutter with reference to corresponding side-cutting edges of other blades.

22. A rotary disc cutter having a plurality of radially disposed finish-cutting blades which are of uniform height and whose opposite side cutting edges are symetrically disposed with reference to a plane of rotation perpendicular to the axis of the cutter, corresponding side-cutting edges of the blades having the same concave circular arcuate profile shape and having the same inclination to said plane of rotation, and certain of the blades having their side cutting edges offset axially of the cutter with reference to corresponding side cutting edges of other blades.

ERNEST WILDHABER.